(12) United States Patent
Moroi et al.

(10) Patent No.: US 6,581,743 B2
(45) Date of Patent: Jun. 24, 2003

(54) ELECTROMAGNETIC SPRING CLUTCHES

(75) Inventors: Takahiro Moroi, Kariya (JP); Shigeru Suzuki, Kariya (JP); Masami Niwa, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/901,960

(22) Filed: Jul. 10, 2001

(65) Prior Publication Data

US 2002/0003077 A1 Jan. 10, 2002

(30) Foreign Application Priority Data

Jul. 10, 2000 (JP) .......................... 2000-208496

(51) Int. Cl.[7] .................. F16D 41/20; F16D 13/08
(52) U.S. Cl. ...................... 192/84.81; 192/81 C
(58) Field of Search ................. 192/35, 84.81, 192/81 C, 41 S

(56) References Cited

U.S. PATENT DOCUMENTS

| 2,979,925 | A | * | 4/1961 | Hungerford | 192/41 S |
| 3,735,847 | A | * | 5/1973 | Brucken | 192/84.81 |
| 4,262,787 | A | * | 4/1981 | Takefuta et al. | 192/84.81 |
| 4,273,226 | A | * | 6/1981 | Takefuta et al. | 192/84.81 |
| 4,466,522 | A | * | 8/1984 | Shibuya | 192/84.81 |
| 4,619,351 | A | * | 10/1986 | Takatoshi | 192/35 |
| 5,090,538 | A | * | 2/1992 | Osawa | 192/84.81 |
| 6,247,569 | B1 | * | 6/2001 | McGuire et al. | 192/84.81 |
| 6,352,416 | B1 | * | 3/2002 | Ota et al. | 417/222.2 |

FOREIGN PATENT DOCUMENTS

| DE | 31 47 468 A1 | 12/1982 | ............ B60H/1/00 |
| JP | 58-193939 | 11/1983 | ............ F16D/27/14 |
| JP | 6-73464 | 10/1994 | ............ F16D/13/08 |
| JP | 10-068434 | 3/1998 | ............ F16D/41/20 |

* cited by examiner

*Primary Examiner*—Rodney H. Bonck
(74) *Attorney, Agent, or Firm*—Morgan & Finnegan, LLP

(57) ABSTRACT

An electromagnetic spring clutch may be utilized to engage a drive shaft 8 of a auxiliary machine for vehicle 2 and may include an input pulley 1 rotatably supported by a housing of the auxiliary machine for vehicle 2. An electromagnetic coil 5a may be disposed within the input pulley 1 and an armature 11 may be reversibly coupled to the input pulley 1 by the electromagnetic coil 5a. An output hub 7 may transmit torque applied to the input pulley 1 to the drive shaft 8. Preferably, the output hub 7 is prevented from moving in an axial direction relative to the drive shaft 8 and a clearance C is defined between the input pulley 1 and the output hub 7. Preferably, the clearance C is prevented from increasing during operation. A coil spring 4 may couple the armature 11 to the output hub 7. The coil spring is preferably prevented from the intruding into the clearance C between the input pulley 1 and the output hub 7.

16 Claims, 2 Drawing Sheets

ELECTROMAGNETIC SPRING CLUTCHES

BACKGROUND OF THE INVENTION

1. Technical Field

The present invention relates to electromagnetic spring clutches that preferably may be utilized to intermittently drive auxiliary machines for vehicle, such as the water pump, compressor and viscous heater disclosed, for example, in DE 3,147,468. More particularly, the present invention relates to electromagnetic spring clutches that may preferably transmit torque from an automotive engine to the auxiliary machines for vehicle by utilizing a coil spring.

2. Description of the Related Art

A known-electromagnetic spring clutch is disclosed in Japanese Laid-Open Patent Publication No. 58-193939 and includes an electromagnetic coil disposed within an input pulley that is driven by an engine. An armature is disposed at an output hub that is coupled to a rotary shaft of an auxiliary machine for vehicle. The armature is attached to and removed from the input pulley by energizing and de-energizing the electromagnetic coil. The known electromagnetic spring clutch further includes a coil spring mounted around the outer circumference of an input-side winding portion provided on the input pulley and the outer circumference of an output-side winding portion provided on the output hub. One end of the coil spring is coupled to the armature and the other end of the coil spring is coupled to the output hub. When the armature is magnetically coupled to the input pulley by the electromagnetic coil, the coil spring winds onto the input-side winding of the input pulley and onto the output-side winding of the output hub. As the result, torque from the input pulley is transmitted to the output hub and thus to the rotary shaft of the auxiliary machine for vehicle due to the winding force of the coil spring.

The input-side winding portion of the input pulley and the output-side winding portion of the output hub are separated by a minute clearance. The width of the clearance normally does not allow the coil spring to intrude into the clearance. However, when the coil spring wraps around the outer circumference of the input-side winding portion and the output-side winding portion in order to transmit torque, a force is exerted on the inner circumference of the coil spring, which force widens the clearance. When the clearance is widened, the coil spring may possibly intrude into the clearance and prevent the smooth operation of the electromagnetic spring clutch.

SUMMARY OF THE INVENTION

It is an object of the present invention to provide improved electromagnetic spring clutches. In one embodiment of the present electromagnetic spring clutches, the coil spring is prevented from intruding or entering into the clearance between an input-side winding portion and an output-side winding portion during the transmission of torque.

For example, electromagnetic spring clutches of the present teachings may be preferably utilized with a driven device, such as a water pump, compressor or other auxiliary machine for vehicle, that is driven by a rotary or drive shaft. Such electromagnetic spring clutches may include an input-side member, such as an input pulley, and an output-side member, such as an output hub, which parts may be reversibly coupled by an armature and a coil spring. For example, the armature can be attached to and removed from the input-side member by energizing and de-energizing an electromagnetic coil. Further, the coil spring preferably extends from the outer circumference of the input-side member to the outer circumference of the output-side member. In addition, one end of the coil spring is preferably coupled to the armature and the other end of the coil spring is preferably coupled to the output-side member. Thus, when the input-side member and the output-side member are magnetically coupled via the armature, the output-side member will transmit a driving force to the rotary shaft of the driven device. More preferably, the output-side member and the rotary shaft are prevented from moving relative to each other in the axial direction in order to restrict movement of the output-side member along its axial direction. Thus, the relative position of the input-side member and the output-side member will not change during operation. As the result, the coil spring is prevented from intruding into the clearance between the input-side member and the output-side member.

Other objects, features and advantage of the present invention will be readily understood after reading the following detailed description together with the accompanying drawings and the claims.

DETAILED DESCRIPTION OF THE INVENTION

Figure 1:
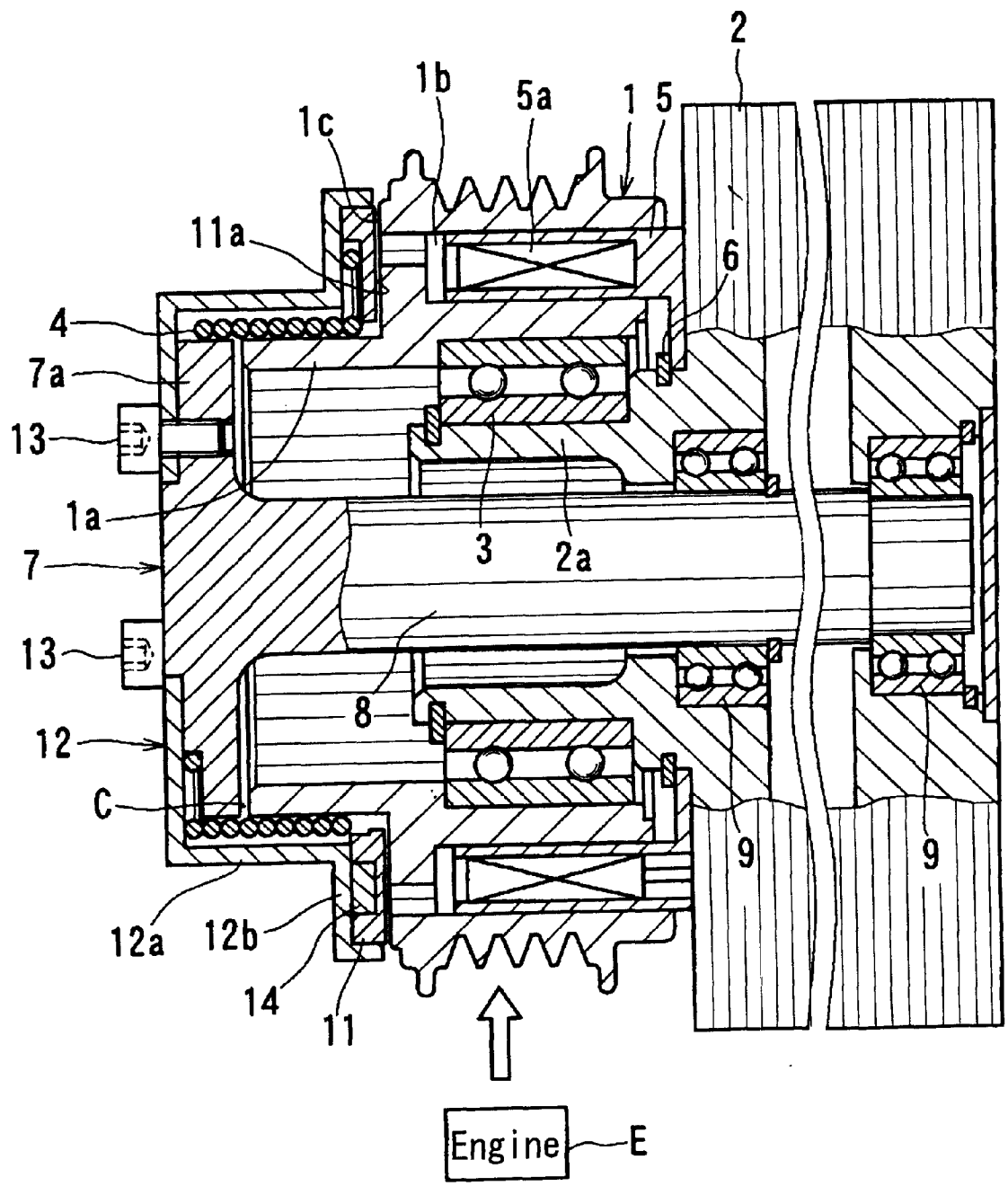
FIG. 1 shows an electromagnetic spring clutch according to a first representative embodiment of the present teachings.

Representative electromagnetic spring clutches according to the present teachings may preferably be directly coupled to a driven device that is driven by means of a rotary shaft. An input-side member may be reversibly coupled to an armature by means of an electromagnetic coil. An output-side member may transmit a driving force to the rotary shaft of the driven device. A coil spring preferably extends from the outer circumference of the input-side member to the outer circumference of the output-side member. One end portion of the coil spring may be coupled to the armature and the other end portion of the coil spring may be coupled to the output-side member. Relative movement in the axial direction between the output-side member and the rotary shaft are preferably prevented. Because the relative movement between the output-side member and the rotary shaft is prevented with respect to the axial direction, the relative positions of the input-side member and the output-side member can be maintained as a constant. As the result, the coil spring will not intrude into the clearance between the input-side member and the output-side member. Thus, electromagnetic spring clutches of the present teachings provide improved operating characteristics.

Preferably, the output-side member may be integrally constructed with the rotary shaft in order to reduce the number of parts and to decrease the number of assembly steps that are required to manufacture the electromagnetic spring clutch, thereby resulting a manufacturing cost reduction. For example, the output-side member and the rotary shaft may be seamlessly connected. Alternatively, the output-side member and the rotary shaft may preferably be joined by utilizing a pressure or compression joint in order to avoid vibrations between the joined surfaces of the output-side member and the rotary shaft. By utilizing pressure joining, the output-side member can be prevented from inclining toward the rotary shaft and therefore, the clearance between the input-side member and the output-side member can be maintained as a constant. Consequently, the coil spring is prevented from intruding or entering into the clearance.

Further, the rotary shaft may be axially supported at least in two locations. By supporting the rotary shaft at a plurality of points, the output-side member can be prevented from inclining toward the input-side member.

In one preferred embodiment, an input pulley may be utilized as the input-side member and an output hub may be utilized as the output-side member. Further, a compressor or a pump may preferably be utilized as the driven device.

Each of the additional features and method steps disclosed above and below may be utilized separately or in conjunction with other features and method steps to provide improved electromagnetic spring clutches and methods for designing and using such electromagnetic spring clutches. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.

In the following representative embodiments, the electromagnetic spring clutches are utilized with a water pump 2 as an auxiliary machine, which may be preferably utilized to supply fluids for a vehicle heater. However, other uses of the present electromagnetic spring clutches are clearly contemplated as further discussed above and below. As shown in FIG. 1, one or more bearings 3 rotatably support a cylindrical input pulley 1 on the outer circumference of a cylindrical portion 2a that is formed on an end portion of a housing of the water pump 2. As further shown in FIG. 1, the driving force of an engine E drives the input pulley 1 via a V-belt, which V-belt is not shown in FIG. 1 for the purpose of clarity. The input pulley 1 may comprise, for example, iron, steel or another magnetic material. The surface of the input pulley 1 may be preferably treated with chromate treatment in order to prevent rusting and/or corrosion.

The input pulley 1 preferably includes a cylindrical part 1a that protrudes from the side surface of the input pulley 1 toward the direction opposite the housing of the water pump 2 (to the left in FIG. 1). The cylindrical part 1a functions as an input-side winding portion for a coil spring 4. A stator 5 accommodates an electromagnetic coil 5a and a circlip 6 may connect the stator 5 to the housing of the water pump 2. The stator 5 is preferably disposed within an annular groove 1b formed in the inner side surface of the input pulley 1. A small or minute clearance is provided between the groove 1b and the outer circumference of the stator 5. The groove 1b and the stator 5 do not contact each other when the input pulley 1 rotates.

An output hub 7 is integrally constructed with a drive shaft 8 of the water pump 2. That is, the output hub 7 and the drive shaft 8 form a single piece without a seam between the two parts. A flange 7a is preferably extends substantially perpendicular from an end portion of the drive shaft 8 and the flange 7a may correspond to the output-side winding of the coil spring 4. A small or minute clearance C separates the flange 7a from the axial end surface of the cylindrical part 1a of the input pulley 1. Due to the clearance C, the flange 7a and the cylindrical part 1a are prevented from interfering with each other, while the outer circumference of the flange 7a is aligned with the outer circumference of the cylindrical part 1a. Two or more bearings 9 rotatably support the drive shaft 8 along its axial direction at two locations.

An armature 11 is preferably provided on the side surface of the cylindrical part 1a of the input pulley 1 so as to oppose the electromagnetic coil 5a. The armature 11 preferably includes a frictional surface 11a and the input pulley 1 preferably includes a frictional surface 1c. Therefore, the frictional surfaces 11a and 1c will contact each other when the electromagnetic coil 5a is energized. The coil spring 4 is disposed around the outer circumference of the cylindrical part 1a and the outer circumference of the flange 7a. Therefore, the coil spring 4 can transmit torque from the engine to the flange 7a via the input pulley 1 and the armature 11. One end portion of the coil spring 4 is preferably connected to an indentation formed on the inner circumference of the armature 11. The other end portion of the coil spring 4 is preferably connected to an indentation formed on the outer circumference of the flange 7a.

A spring cover 12 may enclose or cover the output hub 7, the coil spring 4 and the armature 11. The spring cover 12 preferably includes a tubular portion 12a and a collar portion 12b that enclose the above described three parts. For example, the tubular portion 12a may cover or enclose the side surface of the flange 7a and the coil spring 4. The spring cover 12 can be fastened to the side surface of the flange 7a, for example, by means of bolts 13.

The outer rim of the collar 12b protrudes toward the armature 11 and the inner circumference of the protrusion of the collar 12b engages the armature 11. Further, the armature 11 is connected to a magnet 14. Therefore, when the electromagnetic coil 5a is not energized, the armature 11 is attached or coupled to the spring cover 12 by the magnet 14. Thus, a clearance is provided and maintained between the frictional surface 1c of the input pulley 1 and the frictional surface 11a of the armature 11. Such clearance is generally known as an "air clearance." If the air clearance is present, the input pulley 1 can rotate, but the output hub 7 will not rotate and the torque of the engine will not be transmitted to the armature 11. On the other hand, when the electromagnetic coil 5a is energized, the frictional surface 11a of the armature 11 moves towards and connects to the frictional surface 1c of the input pulley 1. Therefore, when the armature 11 rotates, the coil spring 4, which is connected to the armature 11 and to the output hub 7, will wrap around the outer circumference of the cylindrical part 1a of the input pulley 1 and around the outer circumference of the flange 7a of the output hub 7. Due to the winding force of the coil spring 4, the torque of the input pulley 1 is transmitted to the drive shaft 8 of the water pump 2 via the output hub 7. Naturally, when the electromagnetic coil 5a is de-energized again, the armature 11 will detach from the frictional surface 1c of the input pulley 1 due to the magnet 14. Therefore, the transmission of torque to the output hub 7 is interrupted.

The output hub 7 and the drive shaft 8 of the water pump 2 are preferably manufactured in an integral form and then mounted within the electromagnetic spring clutch. Further, the output hub 7 and the drive shaft 8 are prevented from moving relative to each other in the axial direction of the drive shaft 8. In other words, the output hub 7 and the drive shaft 8 are mutually constrained to prevent movement in the axial direction of the drive shaft 8. Moreover, the drive shaft 8 is supported against the housing of the water pump 2 at two locations by means of the bearings 9 and therefore, the output hub 7 is prevented from inclining. Thus, the clearance C between the flange 7a and the cylindrical part 1a can be maintained at its initial setting value. Further, the clearance C preferably does not increase even when a force is exerted onto the clearance C that would ordinarily widen the clearance due the torsion of the coil spring 4 during the torque transmitting operation. As the result, the coil spring 4 is prevented from intruding or entering into the clearance C. Thus, improper activation of the clutch can be avoided. Further, because the output hub 7 and the drive shaft 8 are integrally constructed, the number of parts of the electromagnetic spring clutch can be reduced, the construction of the water pump can be simplified and the number of assembly steps to manufacture the electromagnetic spring clutch can be decreased.

Figure 2:
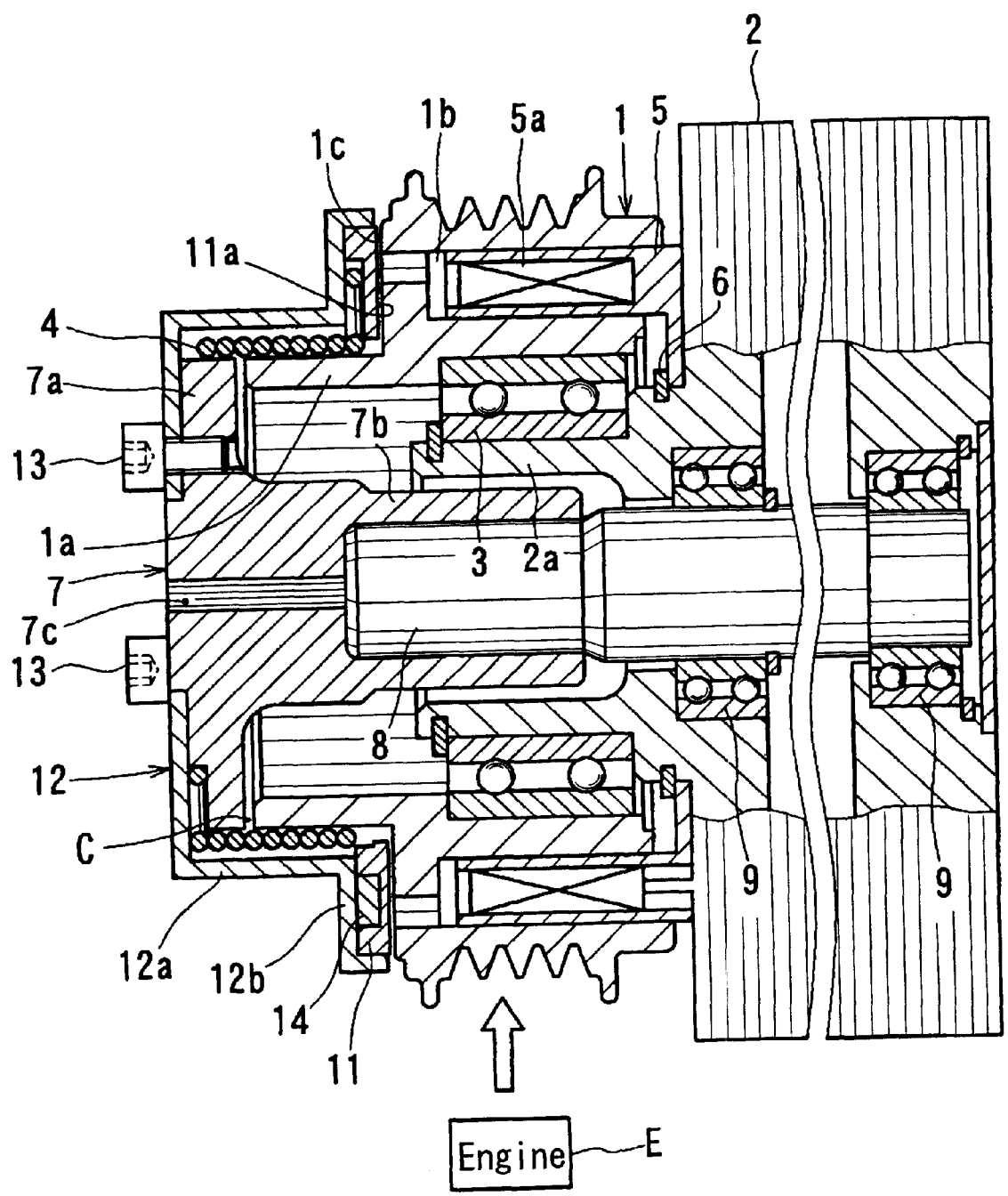
FIG. 2 shows an electromagnetic spring clutch according to a second representative embodiment of the present teachings.

FIG. 2 shows a second representative embodiment of the invention. Parts that are the same or similar to the first representative embodiment are identified with identical reference numbers and further explanation of such parts is not necessary. However, according to the second representative embodiment, the output hub 7 is coupled to the drive shaft 8 by utilizing a pressure joint, which pressure joint prevents the output hub 7 from being inclined. In FIG. 2, the drive shaft 8 is press-fitted into and joined with the center hole of the output hub 7 by utilizing a pressure joining technique, which is well known in the art and thus, a detailed explanation of pressure joining techniques is not required. The output hub 7 includes a penetrating hole 7c in order to release air in the center hole provided within the output hub 7 when the end portion of the drive shaft 8 is forcibly inserted into the center hole of the output hub 7. By utilizing a pressure joint, the output hub 7 and the drive shaft 8 will not vibrate relative to each other and therefore, the output hub 7 is prevented from being inclined toward the drive shaft 8. Other features of the second embodiment are substantially the same with the features of the first representative embodiment and therefore, the descriptions thereof are abbreviated.

Various modifications of the present teachings are naturally contemplated. For example, the present electromagnetic spring clutches also can be used, for example, within a compressor, a viscous heater, or other driven devices that are driven by an engine of the automobile. Further, the representative electromagnetic spring can be used in a driven device other than auxiliary machines for vehicle. Moreover, although the drive shaft 8 is inserted into the center hole of the output hub 7 according to the second representative electromagnetic spring clutch, the output hub may be inserted into the center hole of the drive shaft. Further, instead of pressure joining, the integral construction of the output hub 7 and the drive shaft 8 can be established, for example, by means of welding or screws.

What is claimed is:

1. An electromagnetic spring clutch comprising:
   a driven device comprising a rotary shaft,
   an input-side member,
   an electromagnetic coil,
   an armature reversibly coupled to the input-side member by the electromagnetic coil,
   an output-side member that transmits a driving force to the rotary shaft of the driven device, wherein the output-side member and the rotary shaft are unitarily constructed and
   a coil spring extending from the outer circumference of the input-side member to the outer circumference of the output-side member, wherein one end of the coil spring is coupled to the armature and the other end of the coil spring is coupled to the output-side member.

2. An electromagnetic spring clutch according to claim 1, wherein a housing of the driven device rotatably supports the input-side member.

3. An electromagnetic spring clutch according to claim 1, wherein the input-side member includes an input-side winding portion, the output-side member includes an output-side winding portion, the input-side winding portion and the output-side winding portion are disposed so as to oppose each other in the axial direction of the input-side and output-side members, respectively.

4. An electromagnetic spring clutch according to claim 1, further comprising at least two bearings that axially support the rotary shaft with respect to a housing of the driven device at least in two locations of the rotary shaft.

5. An electromagnetic spring clutch according to claim 1, wherein the input-side member includes an input pulley and the output-side member includes an output hub.

6. An electromagnetic spring clutch according to claim 1, wherein a clearance between the input-side member and the output-side member is prevented from increasing.

7. An electromagnetic spring clutch according to claim 1, wherein the coil spring is prevented from the intruding into a clearance between the input-side member and the output-side member.

8. An electromagnetic spring clutch according to claim 1, wherein the driven device is selected from the group consisting of a compressor and a water pump and the rotary shaft includes a drive shaft of the compressor or the pump heater.

9. An electromagnetic spring clutch according to claim 1, wherein the input-side member includes an input pulley, the output-side member includes an output hub, a clearance defined between the input-side member and the output-side member is prevented from increasing and the coil spring is prevented from the intruding into a clearance between the input-side member and the output-side member.

10. An electromagnetic spring clutch according to claim 9, wherein the input pulley includes an input-side winding portion, the output hub includes an output-side winding portion, wherein the input-side winding portion and the output-side winding portion are disposed so as to oppose each other in the axial direction of the input pulley and output hub.

11. An electromagnetic spring clutch according to claim 10, wherein the input pulley is rotatably supported by a housing of the driven device.

12. An electromagnetic spring clutch according to claim 11, further comprising at least two bearings that axially support the rotary shaft against the housing of the driven device in at least in two locations of the rotary shaft.

13. An electromagnetic spring clutch according to claim 12, wherein the driven device is selected from the group consisting of a compressor and a water pump and the rotary shaft includes a drive shaft of the compressor or the pump heater.

14. An electromagnetic spring clutch arranged and constructed to engage a drive shaft of an auxiliary machine for a vehicle, comprising:
   an input pulley rotatably supported by a housing of the auxiliary machine for the vehicle,
   an electromagnetic coil disposed within the input pulley,
   an armature reversibly coupled to the input pulley by the electromagnetic coil, an output hub comprising a flange extending substantially perpendicular from the output hub and a penetrating hole, wherein torque applied to the input pulley is transmitted to the drive shaft via the output hub, and wherein the output hub is prevented from moving in an axial direction relative to the drive shaft due to a pressure joint formed via the penetrating hole, a clearance is defined between the input pulley and the flange and the clearance is prevented from increasing during operation, and a coil spring coupling the armature to the output hub, wherein the coil spring is prevented from the intruding into the clearance between the input pulley and the output hub during operation.

15. An electromagnetic spring clutch according to claim 14, further comprising at least two bearings that axially support the drive shaft in at least in two locations along the drive shaft.

16. An electromagnetic spring clutch according to claim 14, wherein the auxiliary machine for vehicle is selected from the group consisting of a compressor, a water pump and a viscous heater.

* * * * *